July 28, 1964

T. REMENYIK 3,142,809

COOLING ARRANGEMENT FOR ELECTRICAL APPARATUS HAVING
AT LEAST ONE MULTILAYER WINDING

Filed March 27, 1962

INVENTOR.

Tibor Remenyik

BY

ATTORNEYS

United States Patent Office 3,142,809
Patented July 28, 1964

3,142,809
COOLING ARRANGEMENT FOR ELECTRICAL APPARATUS HAVING AT LEAST ONE MULTI-LAYER WINDING
Tibor Remenyik, Zurich, Switzerland, assignor to Andrew A. Halacsy, Mountain View, Calif.
Filed Mar. 27, 1962, Ser. No. 182,909
Claims priority, application Switzerland Apr. 4, 1961
12 Claims. (Cl. 336—61)

This invention relates to cooling arrangements for electrical apparatus and, more particularly, to an improved and more efficient arrangement for dissipating heat generated in the inner layers of multilayer windings of electrical apparatus.

The problem of dissipating heat generated, during operation, is always present in electrical apparatus having one or more multilayer windings. In electrical apparatus where at least part of the electrical insulation is in the form of a fluid such as air or oil, this fluid can further serve as a coolant if cooling ducts are provided in the windings and if the coolant can circulate through these ducts. However, this type cooling is not possible if the winding is encapsulated within a relatively solid insulating or dielectric material.

A known procedure is to attach cooling fins to the outermost turn or layer of each multilayer winding thus to increase the heat dissipation surface of the winding. However, studies of the temperature distribution in multilayer windings shows that the temperature increase within the winding cannot be reduced sufficiently solely by providing cooling fins for increasing the heat dissipation surface of the outermost layer of the winding.

In accordance with the present invention, heat dissipation from the inner layers of a multilayer or multiturn winding is effected by electrically and heat conductively uniting cooling fins to one or more inner or enclosed layers of the winding, with these fins extending outwardly through overlying layers to project externally of the windings. The cooling fins are preferably generally flat with a large surface area sufficient to provide adequate heat dissipation from the underlying or inner layers of the windings.

For an understanding of the principles of the invention, reference is made to the following description of typical embodiments thereof as illustrated in the accompanying drawings. In the drawings.

Figure 1:
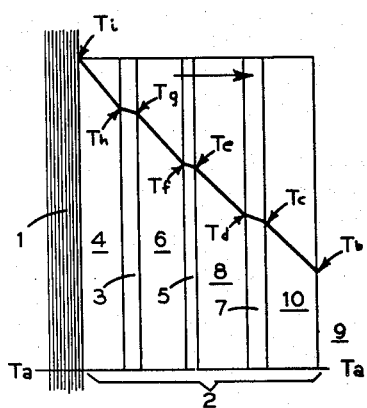
FIG. 1 is a graphic diagram illustrating the temperature differentials existing in a multilayer electrical winding.

FIG. 1, which is an explanatory diagram showing the interior temperature rise, illustrates the cross section of the right-hand half of a vertically disposed multilayer winding. This multilayer winding 2 embraces a magnetic, preferably steel core 1 and comprises consecutive layers of electrical conductors, indicated at 3, 5 and 7, each disposed between layers of dielectric material 4, 6, 8 and 10. The coil is disposed in an ambient medium, as indicated at 9, which may be air or any suitable fluid.

Heat is generated, during operation, in the core 1 and in the layers 3, 5 and 7 of electrical conductors, and this heat flows radially outwardly as indicated by the arrows. In other words, the temperature decreases from the interior of the multilayer winding to the exterior thereof. The temperature gradient is indicated by ordinates extending vertically from the axis $T_a-T_a$. The temperature differentials $T_i-T_h$, $T_g-T_f$, $T_e-T_d$ and $T_c-T_b$ in the insulation or dielectric layers 4, 6, 8 and 10 are much greater than the temperature differentials $T_h-T_g$, $T_f-T_e$ and $T_d-T_c$ in the layers 3, 5 and 7 of electrical conductors. FIG. 1 thus graphically illustrates the relatively large temperature increases occurring in the dielectric layers in the interior of the multilayer winding 2. If heat can be dissipated from each layer 3, 5 and 7 of electric conductors directly to the ambient medium 9, the differentials $T_i-T_h$, $T_g-T_f$, $T_e-T_d$, and $T_c-T_b$ can either be eliminated or at least can be made so as not to augment each other and thus greatly increase the temperature at the interior of the multilayer winding.

Figure 2:
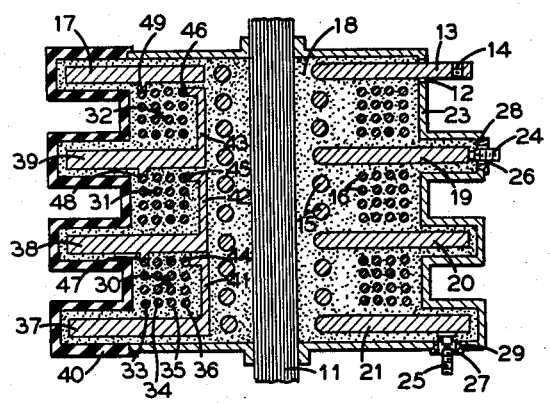
FIG. 2 is an axial sectional view through electrical apparatus having multilayer windings, and illustrating one embodiment of the cooling arrangement of the invention.
Figure 3:
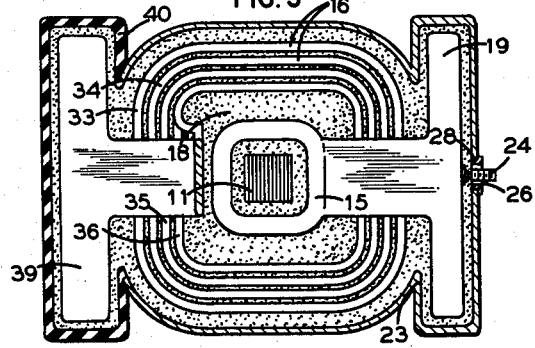
FIG. 3 is a sectional view taken at right angles to that of FIG. 2.

Referring to FIGS. 2 and 3, it should be noted that FIG. 3 is a diametrical sectional view taken essentially at the fins 19 and 39 of FIG. 2. In this exemplary embodiment of the invention, a coil, comprising an inner winding composed of conductors 15 and an outer winding composed of conductors 16, is wound on a steel core 11. The conductors 15 of the inner winding are embedded in dielectric material 18 which fills all the space between conductors 15 and core 11 and between conductors 15 and the innermost conductors 16.

In accordance with the invention, cooling fins 13, 19, 20 and 21 are provided and are electrically and heat conductively united to every third turn of winding 15, as by soldering, brazing, welding, pressing, or any other known method to the art. These cooling fins extend outwardly from the exterior surface of the coil, being embedded in the dielectric material 18. The fins may be made of copper or aluminum sheets, or of any other suitable heat conductive material including dielectric heat conductive material, and may be coated with a dielectric substance which is different from the dielectric material 18. The insulating coating on the fins is protected by a cover or casing 23 which may be made, for example, of a steel sheet and in any known manner. If desired, the dielectric material 18 as well as the cover or casing 23 may be omitted, particularly if they are not necessary.

The cooling fins 13, 19, 20 and 21 further serve as terminals of the coil and, to this end, are provided with a tapped terminal hole 14 and with terminal lugs 24 and 25, respectively. The terminal constituted by the fin 13 with its tapped hole 14 extends through an opening 12 in the cover 23, and the terminals 24 and 25 extend through openings 26 and 27, respectively, in the casing or cover 23, these terminals being surrounded by dielectric materials 28 and 29, respectively.

The outer winding, comprising the conductor 16, consists of axially spaced sections 30, 31 and 31 each comprising four layers, 33, 34, 35 and 36, of conductors or turns. The space between the conductors is also filled with the dielectric material 18 so that the conductors 16 are deeply embedded in this dielectric material for effective insulation with respect to high voltages. While the dielectric material 18 may be used also for insulating the conductors 16 of the outer windings, it should be understood that different dielectric materials may be used for the inner and outer windings. Cooling fins 37, 38 and 39 extend radially through the axial spaces separating the sections 30, 31 and 32, and a cooling fin 17 overlies one end of the outer winding. All of the cooling fins 17, 37, 38 and 39 are embedded in the dielectric material, and the outer surfaces of the cooling fins may be coated with dielectric material.

The inner ends 41, 42 and 43 of the cooling fins 37, 38 and 39, respectively, extend to the innermost layer 36 of the outer winding and provide electrical connections to the terminations 44, 45 and 46 of the several axially spaced winding sections. The other terminations 47, 48 and 49 of the axially spaced sections are connected to adjacent cooling fins in the same manner, with termination 44 of winding section 30 being connected to cooling fin 37 and its other terminaton 47 being connected to cooling fin 38. One terminus 45 of section 31 is connected to cooling fin 38, and the other terminus 48 to cooling fin 39. Similarly, one terminus of section 32 is connected to cooling fin 39 and the other terminus 49 to the cooling fin 17. Thus, the several cooling fins act as terminal and intermediate connections for the several coil sections and, even though such an arrangement is not specifically illustrated in FIGS. 2 and 3, it will be apparent that the outer winding comprising the conductor 16 may be provided with terminal arrangements similar to those provided for the inner winding comprising the conductors 15.

The cooling fins 17, 37, 38 and 39 can be joined to the conductor 16 by soldering, welding, pressing, casting or any other known method of providing an electrical and heat conductive joint between the parts, such methods being well known and not comprising part of the invention. It will be noted that the cooling fins 13, 19, 20 and 21 extend in one direction from the coil, and the cooling fins 17, 37, 38 and 39 extend in the opposite lateral direction therefrom. The cooling fins 17, 37, 38 and 39 may be protected from mechanical damage in any suitable manner, such as by a layer of glass-reinforced plastic composition material 40.

Figure 4:
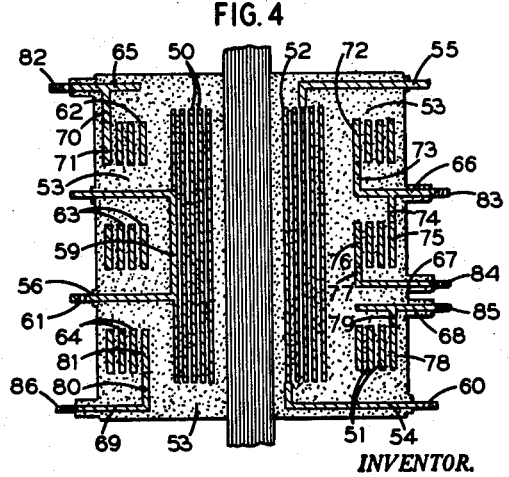
FIG. 4 is an axial sectional view through another electrical apparatus having multilayer windings and illustrating a further embodiment of the invention.

FIG. 4 illustrates the invention as applied to an electrical apparatus comprising inner and outer multilayer windings 50 and 51, respectively, wound on a magnetic core, such as a steel core. The inner winding comprises a metal foil 52, such as copper or aluminium foil, which is completely embedded in dielectric material 53 filling all the spaces within the coil except where these spaces may be occupied by the winding itself. In this arrangement, electrical and heat conductive cooling fins 54, 55 and 56 are electrically and heat conductively connected to the inner winding 50 in such a manner as to serve as electrical connections thereto. The cooling fins 56 constitute the legs of a U-shaped cross-section element formed of a single sheet of metal and having a base 59.

In axial elevation, the winding can have any suitable geometric shape such as a circle, an ellipse, a polygon, etc., the axial shape of the winding forming no part of the present invention. It will be noted that the cooling fins 54 and 55 extend outwardly at each end of the outer winding 51, whereas the cooling fins 56 extend outwardly through the outer winding 51 and are electrically insulated therefrom by means of the dielectric material 53. This dielectric material 53 may be the same for all insulation within the apparatus, or different kinds of dielectric material may be chosen for different parts of the apparatus, in accordance with the parameters to be fulfilled.

The fins 54, 55 and 56 are not insulated in those portions extending outside the outer winding, although an insulating and protective coating or cover can be applied to these fins in the same manner as shown in FIGS. 2 and 3. Cooling fin 54 and one branch of cooling fin 56 are formed with tapped lug holes 60 and 61, respectively.

The outer winding 51 is a disk or pancake type of winding comprising three sections 62, 63 and 64 embedded in the dielectric material 53 and electrically insulated from the cooling fins 54, 55 and 56 of the inner winding 50. It will be noted that the cooling fins 54 and 55 of the inner winding 50, and the cooling fins 66, 67 and 68 of the outer winding, extend in the same general direction from the windings, whereas the cooling fin 56 of the inner winding and the cooling fins 65 and 69 of the outer winding extend in the opposite direction from the winding. Cooling fin 65 is directly electrically and heat conductively connected to the last turn 71 of the outer winding 51 at the point 70. The first or innermost turn 72 of the section 62 of the outer winding is directly electrically and heat conductively connected to the cooling fin 66 at 73, and cooling fin 66 is directly electrically and heat conductively connected to the outer turn 75 of the winding section 63, as at 74. The cooling fin 67 is directly electrically and heat conductively connected to the inner turn of the winding section 63, as at 77, and the cooling fin 68 is directly electrically and heat conductively connected to the outer turn 78 of the winding section 64. The cooling fin 69 is directly electrically and heat conductively connected, at 80, to the inner turn 81 of the winding section 64. All of the joints between the cooling fins and the several sections of the outer winding may be made by welding, soldering, pressing, casting or any known method, not constituting part of the invention.

The cooling fins 65 through 69 are provided with terminal lugs 82 through 86, respectively, with the lugs 83, 84 and 85 constituting taps of the outer winding and the lugs 82 and 86 constituting the end or terminal connections therefor. The entire outer winding 51 may be connected in circuit if terminal lugs 82 and 86 are connected to a source of electric potential which, because it is conventional, has not been shown in FIG. 3. On the other hand, if the source of electric potential is connected between one terminal lug and one tap lug, only the winding section included between such terminal lug and tap lug will be in the circuit. Thus, any one or more or all of the three winding sections of the outer winding 51 may be connected to a source of electrical potential.

The cooling fins 65 through 69 are embedded in the dielectric material 53, with the terminal lugs 82 through 86 extending through and outwardly of this dielectric material. If desired, all of the cooling fins 65 through 69 may be coated with either an electrically conductive or an electrically non-conductive, and mechanically strong, covering or coating if necessary.

Figure 5:
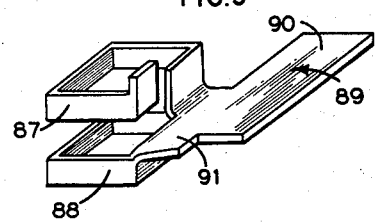
FIG. 5 is a perspective view illustrating two turns of a winding electrically interconnected by a cooling fin electrically and heat conductively united to both turns.

FIG. 5 illustrates two windings or turns 87 and 88 which are electrically and heat conductively interconnected by a cooling fin 89. With the arrangement shown in FIG. 5, it is possible that the turns 87 and 88 lie parallel to a diametric plane through the axis of the coil, without any helical pitch, and it is known to the art that the axial length of a coil can be reduced by the width of one turn in this manner. FIG. 5 further illustrates that a cooling fin may have an extent greater than the coil diameter, as shown at 90, or smaller than the coil diameter, as shown at 91.

Figure 6:
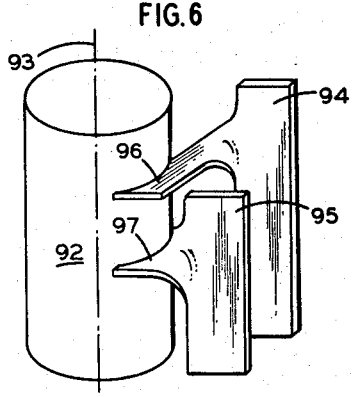
FIG. 6 is a perspective view illustrating two heat dissipating fins projecting from a multilayer winding.

FIG. 6 illustrates a cylindrical coil 92 wound about a vertical axis 93. In such instance, cooling fins 94 and 95 extend horizontally from the coil, as at 96 and 97, and are then twisted so as to extend vertically. Thereby the normal flow of coolant due to the heating thereof, and which is in a substantially vertical direction, can extract heat most efficiently from the surfaces of the cooling fins 94 and 95.

It will be clear from the foregoing description that the invention is not limited to any particular or specific form of coil or cooling fin, and may be used with any type of electrical apparatus such as insulated cables, busbars, switches, circuit breakers, ovens, and heaters, as well as for coils of all types of electrical machinery such as transformers, capacitors, solenoids, relays, and the like.

While specific embodiments of the invention have been shown and described in detail to illustrate the application of the principles of the invention, it will be understood that the invention may be embodied otherwise without departing from such principles.

What is claimed is:

1. An electrical device comprising, at least one multilayer winding; and at least one cooling fin electrically and mechanically directly connected to an inner layer of said winding in heat conduction relation with the latter, and extending outwardly through said winding to project outwardly thereof, in by-passing relation with the outer layers of said winding.

2. An electrical device, as claimed in claim 1, in which the cross sectional area of each cooling fin is substantially larger than that of the conductor of the inner layer to which it is connected.

3. An electrical device, as claimed in claim 1, in which each winding and its associated cooling fin is encapsulated in dielectric material; the cooling fin extending outwardly beyond said dielectric material for heat dissipating surface contact with an ambient medium.

4. An electrical device, as claimed in claim 3, in which the dielectric material encapsulating each winding differs from the dielectric material encapsulating the associated cooling fin.

5. An electrical device, as claimed in claim 1, in which each cooling fin constitutes an electrical conductor of its associated winding.

6. An electrical device, as claimed in claim 1, in which each winding is subdivided into separate sections; the separate sections being electrically interconnected by cooling fins.

7. An electrical device comprising an inner multilayer winding; an outer multilayer winding coaxial with said inner multilayer winding and substantially coextensive axially therewith, said outer winding being subdivided into axially separated sections; at least one cooling fin electrically and heat conductively connected to an inner layer of said inner winding and extending outwardly through said inner winding in by-passing relation with the outer layers thereof, each cooling fin extending outwardly between sections of said outer winding into heat dissipating relation with an ambient medium; and at least one cooling fin connected to an inner layer of each section of said outer winding and protruding through the section in by-passing relation with the outer layers of said outer winding, and into heat dissipating relation with an ambient medium.

8. An electrical device, as claimed in claim 7, at least one cooling fin being formed at its outwardly protruding end with means for connection to a source of electric potential.

9. An electrical device, as claimed in claim 7, at least one cooling fin being connected to the innermost layer of said inner winding and being formed at its protruding end for connection to a source of electric potential; at least one other cooling fin being connected to the outermost layer of said inner winding and extending outwardly between sections of the outer winding into heat dissipating relation with an ambient medium, said one other fin being formed at its protruding end for electrical connection to a source of potential; certain of the cooling fins connected to said outer winding serving as electrical connections between the sections thereof and having their protruding portions formed for electrical connection to a source of electric potential, to constitute winding taps.

10. An electrical device, as claimed in claim 1, each cooling fin comprising electrically conductive material; and a cover affording mechanical protection for the protruding cooling fins and electrically insulated therefrom.

11. An electrical device, as claimed in claim 1, each cooling fin being metal.

12. An electrical device, as claimed in claim 1, each cooling fin being formed of a dielectric heat conductive material.

References Cited in the file of this patent
UNITED STATES PATENTS

| | | |
|---|---|---|
| 714,232 | Pichler | Nov. 25, 1902 |
| 1,602,043 | Pfiffner | Oct. 5, 1926 |
| 2,714,709 | Diebold | Aug. 2, 1955 |